Figure 1:
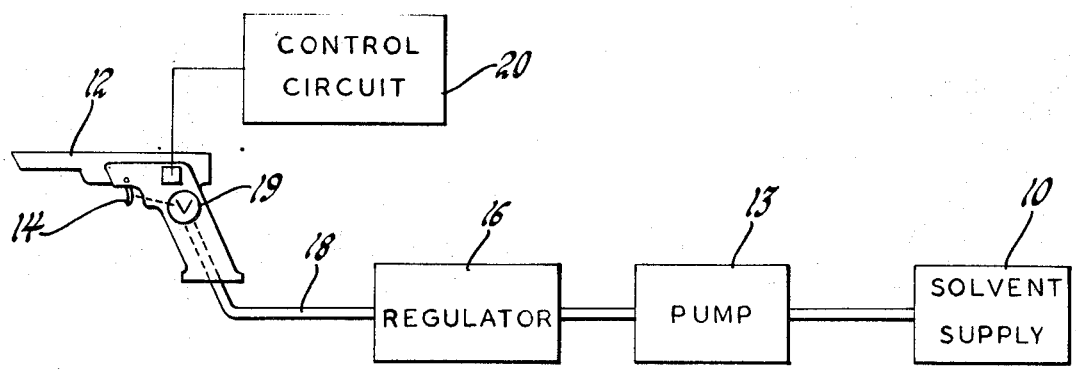

United States Patent

Mikkola

[15] 3,686,475
[45] Aug. 22, 1972

[54] CONTROL CIRCUIT FOR A LIQUID VAPORIZING TOOL

[72] Inventor: John E. Mikkola, Ferndale, Mich.
[73] Assignee: General Motors Corporation, Detroit, Mich.
[22] Filed: March 4, 1971
[21] Appl. No.: 120,854

[52] U.S. Cl.....................219/272, 219/482, 307/86
[51] Int. Cl.........................................F22b
[58] Field of Search......219/272, 482, 377, 328, 329, 219/364; 307/80, 85, 86

[56] References Cited

UNITED STATES PATENTS

| | | | |
|---|---|---|---|
| 2,649,530 | 8/1953 | Dietz | 219/482 X |
| 3,365,567 | 1/1968 | Smith et al. | 219/272 |
| 3,486,081 | 12/1969 | Kanbar | 219/364 UX |
| 3,623,050 | 11/1971 | Kojima | 307/86 X |

FOREIGN PATENTS OR APPLICATIONS 882,878   11/1961   Great Britain.............219/272

Primary Examiner—D. F. Duggan
Attorney—C. R. Meland and Tim G. Jagodzinski

[57] ABSTRACT

A control circuit for controlling the temperature of a liquid vaporizing tool to a temperature required to vaporize the liquid. A low voltage is applied to heating elements on the tool to maintain the tool at the required temperature to vaporize the liquid during standby operation when there is no liquid being supplied to the tool. A high voltage is applied to the heating elements during operation of the tool, when liquid is being supplied thereto, so as to accommodate the increased heat input requirement caused by the vaporization of the liquid to maintain the tool at the vaporizing temperature. A thermal switch located on the tool opens or closes the respective voltage supply circuits to maintain the tool at the required vaporization temperature. In addition, to compensate for the thermal lag in the tool and to accommodate the sudden high heat demand caused by liquid vaporization when the liquid is initially supplied to the tool, the thermal switch is bypassed and the high voltage is applied to the heating elements for a specified time duration in anticipation of the thermal lag.

4 Claims, 2 Drawing Figures

Patented Aug. 22, 1972

3,686,475

INVENTOR.
John E. Mikkola
BY
C. R. Meland
ATTORNEY

CONTROL CIRCUIT FOR A LIQUID VAPORIZING TOOL

This invention relates to a control circuit for controlling the temperature of a liquid vaporizing tool. More specifically, this invention relates to a control circuit which supplies two levels of electrical power for maintaining the temperature of the vaporizing tool in standby and in-use operations respectively and for providing a timed override of the heat controlling element in the vaporizing tool upon start up in anticipation of the thermal lag in the tool.

In liquid vaporizing systems, the liquid vaporizing tool is heated to a temperature sufficient to vaporize the liquid supplied thereto. In known systems of this type, the output of a power supply is supplied to heating elements on the vaporizing tool through a thermal switch which periodically opens and closes in response to the temperature of the tool to maintain the vaporizing tool at the temperature required to vaporize the liquid. When the output potential of the power supply is of such a magnitude so as to be able to maintain the vaporizing tool at a temperature sufficient to vaporize the liquid when the vaporizing tool is in operation, this potential, when the vaporizing tool is in standby operation in which liquid is not being supplied to the tool but the tool is maintained at the required vaporizing temperature, far exceeds the magnitude necessary in order to maintain the vaporizing tool at the required temperature. Consequently, during standby operation when it is desired to maintain the tool at the desired temperature, the voltage applied to the heating elements far exceeds that actually required to maintain the gun at that temperature with the resulting excessive operation of the thermal switch. The consequence of this form of operation is a decreased operating life of the heater, tool and control circuit.

In addition, when the prior liquid vaporizing systems are switched from standby operation to their in-use operation, the sudden heat dissipation caused by the vaporizing liquid lowers the temperature of the vaporizing tool to a point at which a portion of the vapor condenses and is ejected from the tool in the form of liquid before the thermal switch senses the decrease in temperature and supplies power to the heating elements to again bring the vaporizing tool up to the required temperature. This is a consequence of the thermal lag in the tool.

It is the general object of this invention to provide a control circuit for controlling the temperature of a vaporizing tool in a liquid vaporizing apparatus.

It is another object of this invention to provide a control circuit for a liquid vaporizing tool which will improve the operating life of the circuit and tool.

It is another object of this invention to provide a control circuit for a liquid vaporizing tool in which heating elements in the tool are supplied with a low voltage for standby operation and supplied with a high voltage for in-use operation.

It is another object of this invention to provide a control circuit to prevent condensation of the liquid in the vaporizing tool during start up caused by the thermal lag of the tool.

These and other objects of this invention are accomplished by a circuit which is responsive to a sensed temperature of the vaporizing tool below the temperature required to vaporize the liquid when the liquid is not being supplied to the tool (standby operation) to supply a low voltage to heating elements on the tool. When the tool is switched from standby to in-use operation, the circuit supplies a high voltage to the heating elements for a time period independent from the sensed temperature of the tool to compensate for the thermal lag in the tool and thereafter supplies the high voltage to the heating elements when the sensed temperature of the tool is below the required temperature.

Figure 2:
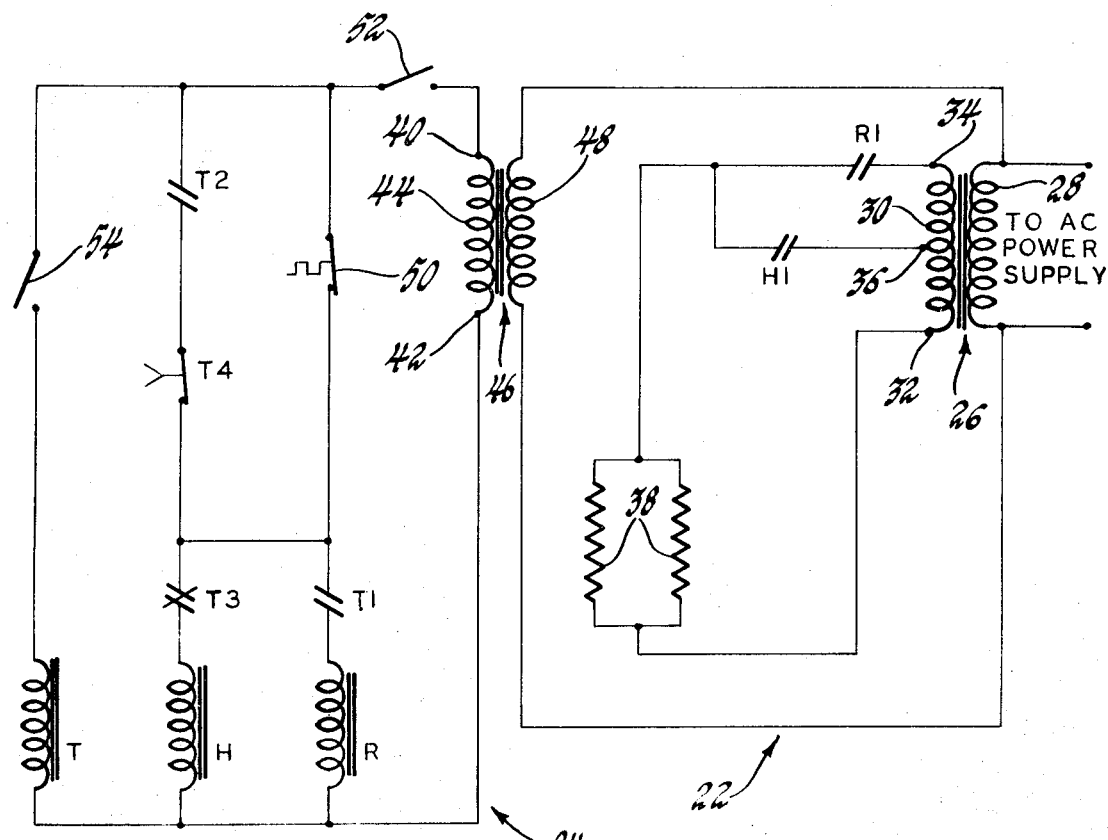

The invention may be best understood by reference to the following description of a preferred embodiment and the drawings in which:

FIG. 1 is a schematic diagram of the liquid vaporizing system using the control circuit of this invention; and FIG. 2 is a circuit diagram of the control circuit used in the preferred embodiment of this invention.

The preferred embodiment is hereinafter described with reference to a solvent vaporizing system in which a paint solvent is vaporized in a vaporizing tool and the resulting vapor is directed at a previously painted surface to reflow the paint. It is understood that the system is not limited to the vaporization of paint solvents but may be used in the vaporization of any liquid.

Referring to FIG. 1, paint solvent from a solvent supply 10 is supplied to a vaporizing tool 12 by a pump 13 through a pressure regulator 16 and a supply line 18. A trigger 14 on the vaporizing tool 12 controls an on-off valve 19 which prevents the flow of solvent through the vaporizing tool 12 when the trigger 14 is in its neutral position and allows the flow of fluid through the vaporizing tool 12 when operated. The mechanical interconnections between the trigger 14 and the valve 19 can be made in any manner known to those skilled in the art. To vaporize the solvent flowing into the vaporizing tool 12, heating elements are mounted on the vaporizing tool 12, and power is supplied thereto to heat the vaporizing tool 12 to a temperature required to vaporize the solvent and to maintain the vaporizing tool 12 at that temperature. A control circuit 20 in conjunction with a thermal switch mounted on the vaporizing tool 12 controls the power input to the heating elements to maintain the desired temperature.

When the trigger 14 is actuated, solvent is supplied to the heated vaporizing tool 12 and is vaporized thereby, the solvent vapor being directed by the vaporizing tool 12 at the paint surface to be reflowed.

Referring to FIG. 2, there is shown the control circuit 20 of FIG. 1. Basically, the control circuit is comprised of a power supply circuit 22 and a circuit 24 for controlling the power supply circuit 22.

The power supply circuit 22 is comprised of a transformer 26 having a primary winding 28 and a secondary winding 30. The primary winding 28 is connected to any conventional AC power supply (not shown). The secondary winding 30 has a common terminal 32, a high voltage output terminal 34 and a low voltage terminal 36. The high voltage terminal 34 is connected to one side of a pair of heating elements 38 through a set of normally open relay contacts R1. The low voltage terminal 36 is connected to the same side of the pair of heating elements 38 through a set of normally open relay contacts H1. The common terminal 32 is connected to the remaining side of the heating elements 38. The heating elements 38 are of a conventional form of resistive heating elements well known in the art.

As previously mentioned with reference to FIG. 1, the heating elements 38 are mounted on the vaporizing tool 12 in FIG. 1 and are operative to heat the tool 12 upon the closing of either the set of normally open relay contacts R1 or H1. When the set of normally open contacts H1 are closed, low voltage from the low voltage terminal 36 is supplied to the heating elements 38 to provide for a low level heat input to the vaporizing tool 12. When the set of normally open contacts R1 are closed, high voltage from the high voltage terminal 34 is supplied to the heating elements 38 to provide a high heat input to the vaporizing tool 12.

To control the heat input to the vaporizing tool 12, the circuit 24 controls the closure of the sets of normally open relay contacts R1 and H1 in a manner so as to maintain the temperature of the vaporizing tool 12 at a temperature required to vaporize the liquid solvent supplied thereto.

Power is supplied to the circuit 24 from the output terminals 40 and 42 of the secondary winding 44 of a transformer 46. The transformer 46 also includes a primary winding 48 connected across the AC power supply.

The circuit 24 includes three relay coils R, H and T. The relay coil R controls the set of normally open relay contacts R1 in the power supply circuit 22, the relay coil H controls the set of normally open relay contacts H1 in the power supply circuit 22, and the relay coil T controls the sets of normally open relay contacts T1 and T2, a set of normally closed relay contacts T3 and a set of normally closed time delay contacts T4. The sets of relay contacts R1, H1, T1, T2 and T3 are all instantaneously actuated in response to the energization or de-energization of the respective relay coils R, H and T. The set of normally closed time delay contacts T4 remain closed upon the energization of the relay coil T for a predetermined time period after which they open. This time delay is selected as a function of the thermal lag in the vaporizing tool 12 for reasons as will subsequently be described.

One side of the relay coil R is connected directly to the output terminal 42. The remaining side of the relay coil R is connected to the output terminal 40 through the set of normally open relay contacts T1, a thermal switch 50 and an on-off switch 52 and is also connected to the terminal 40 through the set of normally open relay contacts T1, the set of normally closed time delay contacts T4, the set of normally open relay contacts T2 and the on-off switch 52. One side of the relay coil H is connected directly to the output terminal 42. The remaining side of the relay coil H is connected to the output terminal 40 through the set of normally closed contacts T3, the thermal switch 50 and the on-off switch 52 and is also connected to the terminal 40 through the set of normally closed contacts T3, the set of normally closed time delay contacts T4, the set of normally open contacts T2 and the on-off switch 52. One side of the relay coil T is connected directly to the output terminal 42 and the remaining side is connected to the output terminal 40 through a valve switch 54 and the on-off switch 52.

As previously indicated with reference to FIG. 1, the thermal switch 50 is mounted on the vaporizing tool 12 to monitor the temperature thereof. This switch may be any one of the well known forms of thermal switches and is adapted so as to open when the temperature of the vaporizing tool 12 is equal to or exceeds the temperature required to vaporize the solvent.

The valve switch 54 is mounted on the vaporizing tool 12 and is adapted to be opened when the trigger 14 is in its neutral position and to be closed when the trigger 14 is in its actuated position.

Referring to FIGS. 1 and 2, when it is desired to place the solvent vaporizing system in standby operation, the on-off switch 52 in the circuit 24 of FIG. 2 is closed. Upon the closing of the on-off switch 52, the relay coil H is energized through the thermal switch 50 and the set of normally closed contacts T3. Energization of the relay coil H closes the set of normally open contacts H1 in the power supply circuit 22 to supply low voltage from the low voltage terminal 36 of the secondary winding 30 to the heating elements 38. This low voltage is sufficient to cause the heating elements 38 to heat the vaporizing tool 12 to the temperature required to vaporize the solvent. When the temperature of the vaporizing tool 12 reaches the required temperature, the thermal switch 50 will periodically open and close in response to the temperature of the vaporizing tool 12 to cause the relay coil H to periodically open and close the set of normally open contacts H1 to maintain the vaporizing tool 12 at the temperature required to vaporize the solvent. The vaporizing tool is now in a standby condition.

When it is desired to reflow a previously painted surface, the trigger 14 of the vaporizing tool 12 is actuated to open the valve 19 to supply solvent to the vaporizing tool 12 and to close the normally open contact 54.

Upon the actuation of the trigger 14, the vaporization of the solvent supplied to the vaporizing tool 12 causes a sudden increase in heat dissipation from the vaporizing tool 12. Due to a thermal lag in the vaporizing tool, the vaporizing tool 12 may cool to a temperature at which condensation of the solvent vapor and an incomplete vaporization of the solvent will occur before the thermal switch 50 can detect such a decrease in temperature. In addition, the input to the heating elements 38 from the low voltage terminal 36 is insufficient to maintain the temperature of the tool 12 when solvent is being vaporized. To compensate for the thermal lag of the vaporizing tool 12 and to provide the additional heat input to compensate for the increased heat dissipation due to solvent vaporization, a high voltage is supplied to the heating elements 38 and the thermal switch 50 is bypassed for a time period sufficient to overcome the thermal lag. This is accomplished upon the actuation of the trigger 14 and the resulting closure of the contacts 54 and energization of the relay coil T. Energization of the relay coil T opens the set of normally closed contacts T3 to de-energize the relay coil H. The resulting opening of the set of normally open contacts H1 disconnects the low voltage output terminal 36 from the heating elements 38. Simultaneously therewith, the sets of normally open contacts T1 and T2 are closed to energize the relay coil R through the set of normally closed time delay contacts T4 independent of the temperature of the vaporizing tool 12 as sensed by the thermal switch 50 for the duration of the time delay of the contacts T4. During this time period, the set of normally open contacts R1 are closed to supply high voltage from the high voltage output terminal 34 to the heating elements 38. Consequently, the heating elements 38 supply a high heat input to the vaporizing tool 12 independent of the behavior of the thermal switch 50. Since the time delay of the set of normally closed time delay contacts T4 is chosen as a function of the thermal lag of the vaporizing tool 12, the vaporizing gun 12 is maintained at the temperature required to vaporize the solvent after the actuation of the trigger 14. After this time delay, the set of normally closed time delay contacts T4 open and thereafter the relay coil R is energized through the thermal switch 50. The set of normally open contacts R1 are, therefore, periodically opened and closed in response to the cyclic de-energization and energization of the relay coil R by the thermal switch 50 to periodically supply high voltage from the high voltage terminal 34 to the heating elements to maintain the vaporizing tool 12 at the required temperature to vaporize the solvent, the high voltage being required to maintain that temperature due to the heat dissipation caused by solvent vaporization.

When the trigger 14 is released and allowed to return to its neutral position, the valve 19 is closed to prevent solvent from flowing through the vaporizing tool 12 and the valve switch 55 is opened to de-energize the relay coil T to again put the circuit 24 in standby condition as previously described.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A control apparatus for controlling the temperature of a liquid vaporizing tool in a liquid vaporizing system which includes the tool, liquid supply means for supplying liquid to the tool and a valve having open and closed positions for selectively allowing or preventing, respectively, the flow of the liquid to the tool, the control apparatus comprising heating elements mounted on the tool, the elements being responsive to voltage applied thereto for heating the tool; a thermal switch mounted on the tool, said switch having a first state when the temperature of the tool is below the temperature required to vaporize the liquid and a second state when the temperature of the tool is at or above said temperature; a first voltage supply having a pair of output terminals; a second voltage supply having a pair of output terminals, the voltage output of the second voltage supply being greater than the voltage output of the first voltage supply; first circuit means responsive to valve position and to the state of the thermal switch for connecting the pair of output terminals of the first voltage supply across the heating elements when the valve is in its closed position and the thermal switch is in its first state; second circuit means responsive to valve position and to the state of the thermal switch for connecting the pair of output terminals of the second voltage supply across the heating elements when the valve is in its open position and the thermal switch is in its first state, whereby the first voltage supply supplies a voltage to the heating elements to maintain the tool at the temperature required to vaporize the liquid when the valve is closed and the second voltage supply supplies a greater voltage to the heating elements to maintain the tool at said temperature when the valve is open, the voltage required to maintain the tool at said temperature being greater when the valve is open than when the valve is closed due to heat dissipation caused by the liquid vaporization.

2. A control apparatus for controlling the temperature of a liquid vaporizing tool in a liquid vaporizing system which includes the tool, liquid supply means for supplying liquid to the tool and a valve having open and closed positions for selectively allowing or preventing, respectively, the flow of the liquid to the tool, the control apparatus comprising heating elements mounted on the tool, the heating elements being responsive to voltage supplied thereto for heating the tool; a thermal switch mounted on the tool, said switch having a first state when the temperature of the tool is below the temperature required to vaporize the liquid and a second state when the temperature of the tool is at or above said temperature; a first voltage supply having a pair of output terminals; a second voltage supply having a pair of output terminals, the voltage output of the second voltage supply being greater than the voltage output of the first voltage supply; first switch means operative when energized to connect the output terminals of the first voltage supply across the heating elements; second switch means operative when energized to connect the output terminals of the second voltage supply across the heating elements; first circuit means for energizing the first switch means when the thermal switch is in its first state and the valve is in its closed position, the tool being maintained at the temperature required to vaporize the liquid when the valve is closed by the voltage supplied to the heating elements from the first voltage supply; and second circuit means for energizing the second switch means when the thermal switch is in its first state and the valve is in its open position, the tool being maintained at the temperature required to vaporize the liquid when the valve is open by the increased voltage supplied to the heating elements from the second voltage supply, the increased voltage being required when the valve is open due to heat dissipation caused by the liquid vaporization.

3. A control apparatus for controlling the temperature of a liquid vaporizing tool in a liquid vaporizing system which includes the tool, liquid supply means for supplying liquid to the tool and a valve having open and closed positions for selectively allowing or preventing, respectively, a flow of the liquid to the tool, the control apparatus comprising heating elements mounted on the tool, the heating elements being responsive to voltage supplied thereto for heating the tool; a thermal switch mounted on the tool, said switch having a first state when the temperature of the tool is below the temperature required to vaporize the liquid and a second state when the temperature of the tool is at or above said temperature; a first voltage supply having a pair of output terminals; a second voltage supply having a pair of output terminals, the voltage output of the second voltage supply being greater than the voltage output of the first voltage supply; first switch means operative when energized to connect the output terminals of the first voltage supply across the heating elements; second switch means operative when energized to connect the output terminals of the second voltage supply across the heating elements; first circuit means including the thermal switch for energizing the first switch means when the valve is in its closed position and the thermal switch is in its first state, the tool being maintained at the required temperature to vaporize the liquid when the valve is closed by the voltage supplied to the heating elements from the first voltage supply; second circuit means including the thermal switch for energizing the second switch means when the valve is in its open position and the thermal switch is in its first state, the tool being maintained at the temperature required to vaporize the liquid when the valve is open by the increased voltage supplied to the heating elements from the second voltage supply, the increased voltage being required when the valve is open due to heat dissipation caused by the liquid vaporization; and means for energizing the second switch means independent of the state of the thermal switch for a predetermined time period after the valve is shifted from its closed position to its open position so as to supply increased voltage from the second voltage supply to the heating elements for the predetermined time period independent of the thermal switch to compensate for the thermal lag in the tool following the sudden increased heat requirement to maintain the tool at the temperature required to vaporize the liquid caused by the vaporization of the liquid.

4. A control apparatus for controlling the temperature of a liquid vaporizing tool in a liquid vaporizing system which includes the tool, liquid supply means for supplying liquid to the tool and a valve having open and closed positions for selectively allowing or preventing, respectively, a flow of the liquid to the tool, the control apparatus comprising heating elements mounted on the tool, the heating elements being responsive to voltage supplied thereto for heating the tool; a thermal switch mounted on the tool, said switch having a first state when the temperature of the tool is below the temperature required to vaporize the liquid and a second state when the temperature of the tool is at or above said temperature; a voltage supply having a pair of output terminals; circuit means including the thermal switch for connecting the output terminals of the voltage supply across the heating elements when the thermal switch is in its first state, the tool being maintained at the required temperature to vaporize the liquid by the voltage applied to the heating elements from the voltage supply; and means for connecting the output terminals of the voltage supply across the heating elements independent of the state of the thermal switch for a predetermined time period after the valve is shifted from its closed position to its open position so as to apply the output of the voltage supply continuously to the heating elements for the predetermined time period independent of the thermal switch to compensate for the thermal lag in the tool following the sudden increased heat requirement to maintain the tool at the temperature required to vaporize the liquid caused by the vaporization of the liquid.

* * * * *